{12} United States Patent
Lowell

(10) Patent No.: US 11,356,874 B2
(45) Date of Patent: Jun. 7, 2022

(54) DETECTING NETWORK DEVICES WITHOUT JOINING A NETWORK

(71) Applicant: Landis+Gyr Innovations, Inc., Alpharetta, GA (US)

(72) Inventor: Alan Blair Lowell, Duluth, GA (US)

(73) Assignee: Landis+Gyr Innovations, Inc., Alpharetta, GA (US)

( * ) Notice: Subject to any disclaimer, the term of this patent is extended or adjusted under 35 U.S.C. 154(b) by 14 days.

(21) Appl. No.: 16/934,421

(22) Filed: Jul. 21, 2020

(65) Prior Publication Data

US 2020/0351686 A1 Nov. 5, 2020

Related U.S. Application Data

(63) Continuation of application No. 16/115,837, filed on Aug. 29, 2018, now Pat. No. 10,764,770.

(51) Int. Cl.
*H04W 4/00* (2018.01)
*H04W 24/08* (2009.01)
*H04B 1/713* (2011.01)
*H04L 69/22* (2022.01)
*H04B 1/38* (2015.01)
*H04L 69/324* (2022.01)

(52) U.S. Cl.
CPC ............ *H04W 24/08* (2013.01); *H04B 1/713* (2013.01); *H04L 69/22* (2013.01); *H04B 1/38* (2013.01); *H04L 69/324* (2013.01)

(58) Field of Classification Search
CPC ..... H04W 24/08; H04L 43/0817; H04L 69/22
See application file for complete search history.

(56) References Cited

U.S. PATENT DOCUMENTS 5,408,506 A * 4/1995 Mincher .............. H04B 1/7156
370/507
2016/0337783 A1* 11/2016 Seok ................... H04L 63/0428
(Continued)

FOREIGN PATENT DOCUMENTS

CA 2717641 A1 4/2011

OTHER PUBLICATIONS

IEEE Standard for Low-Rate Wireless Personal Area Networks (WPANs), Draft IEEE P802.15.4-REVc/D00-B, Revision of IEEE Std 802.15.4-2011, Oct. 5, 2015, 761 pages.
(Continued)

*Primary Examiner* — Bo Hui A Zhu
(74) *Attorney, Agent, or Firm* — Kilpatrick Townsend & Stockton LLP

(57) ABSTRACT

A tool listening device including a transceiver is configured to listen on a radio channel selected from a discovery channel hopping sequence. The tool listening device is configured to identify a preamble, indicating a start of a packet. The tool listening device continues to listen until a packet header is received. The tool listener extracts, from the packet header, a source address, a destination address and a frame type. The tool listening device adds the source address, the destination address, and the frame type to a data structure, and transmits the data structure to an external device, where the data may be visualized. The tool listening device is further configured to select another radio channel from the discovery channel hopping sequence.

20 Claims, 5 Drawing Sheets

(56) References Cited

U.S. PATENT DOCUMENTS

2018/0027054 A1* 1/2018 Toepke .............. H04L 41/0806
                                                                                     709/222
2019/0296996 A1 9/2019 Wee et al.

OTHER PUBLICATIONS

"IEEE Standard for Information Technology-Telecommunications and Information Exchange Between Systems—Local and Metropolitan Area Networks—Specific Requirements.—Part 15.1: Wireless Medium Access Control (MAC) and Physical Layer (PHY) Specifications for.Wireless Personal Area Networks (WPANs)", IEEE Standard, Jan. 1, 2005, pp. 1-580.
U.S. Appl. No. 16/115,837, Non-Final Office Action, dated Nov. 29, 2019, 7 pages.
U.S. Appl. No. 16/115,837, Notice of Allowance, dated May 11, 2020, 7 pages.
Gupta, "Inside Bluetooth Low Energy", Mobile Communications Series, Artech House, Mar. 1, 2013, 395 pages.
PCT Patent Application No. PCT/US2019/048515 , International Search Report and Written Opinion, dated Nov. 12, 2019, 17 pages.
Mike Ryan Isec Partners , "Bluetooth: With Low Energy Comes Low Security", Usenix, The Advanced Computing Systems Association, Sep. 26, 2013, pp. 1-7.

* cited by examiner

| LAN address | PAN ID | TYPE ||||
| | | ACK | DATA | BEACON | MAC COMMAND |
|---|---|---|---|---|---|
| ab:cd:ef:01:02:03 | 10:01 | 0 | 1 | 0 | 1 |
| ab:cd:ef:01:20:30 | 10:01 | 0 | 0 | 1 | 0 |
| ac:99:88:77:11:22 | 20:21 | 1 | 0 | 0 | 1 |
| ac:99:88:66:22:33 | 22:11 | 0 | 0 | 0 | 1 |
| | | | | | |

FIG. 4

DETECTING NETWORK DEVICES WITHOUT JOINING A NETWORK

CROSS-REFERENCE TO RELATED APPLICATIONS

This application is a continuation of U.S. application Ser. No. 16/115,837, filed on Aug. 29, 2018, the contents of which is incorporated by reference for all purposes.

TECHNICAL FIELD

Aspects described herein relate generally to radio frequency network diagnostic tools and more specifically to identifying network devices that are configurable to operate on wireless mesh networks.

BACKGROUND

Resource distribution networks such as power, gas, or water distribution networks can use smart meters to collect and aggregate resource consumption data. Smart meters can help automate billing, reduce cost, and provide advanced analytics tools to utility companies. Smart meters can be configured to operate on a mesh network. A mesh network can be a short-range wireless network with or without a central node.

Before a smart meter is added to an existing network, the smart meter is configured for proper operation, for example, by configuring a set of network parameters. When configured and placed in the field, the smart meter can then automatically establish a connection with a mesh network.

Various diagnostic tools can be used to identify faults with smart meters. Defective smart meters are brought back from the field to a meter repair facility where a technician performs a diagnosis, repair, or reconfiguration. A technician may use a diagnostic tool to determine whether a smart meter is configured for a particular network, is attempting to connect to a network, or is non-operational. Further, a technician may use a diagnostic tool to configure a smart meter to communicate with a test network to enable further analysis or network reconfiguration.

But existing diagnostic tools suffer from deficiencies. Specifically, existing diagnostic tools are either limited to detecting one device at a time, requiring an identifier such as a network or device address in order to search for a meter, or unnecessarily storing entire packets, thereby overloading a visual interface of the diagnostic tool with unnecessary information.

Hence, new solutions are needed.

SUMMARY

Certain aspects and features include a system and method for detecting a radio frequency device. In an example, a tool listening device comprising a transceiver is configured to listen on a radio channel selected from a discovery channel hopping sequence. The discovery channel hopping sequence uses a different sequence from a channel hopping sequence used by the radio frequency device and includes radio channels used by the channel hopping sequence of the radio frequency device. The tool listening device identifies a preamble of a packet. The packet includes a header. The tool listening device continues to listen until the header is received. The tool listening device extracts a source address, a destination address, and a frame type from the header and adds the source address, the destination address, and the frame type to a data structure. The tool listening device transmits the data structure to an external device, which can cause the external device to visualize the data structure. The tool listening device, responsive to either receiving a packet or determining that a predetermined amount of time has lapsed, is configured to select a next radio channel from the discovery channel hopping sequence and listen on that channel.

These illustrative examples are mentioned not to limit or define the disclosure, but to provide examples to aid understanding thereof. Additional examples and further description are provided in the Detailed Description.

BRIEF DESCRIPTION OF THE FIGURES

These and other features, aspects, and advantages of the present disclosure are better understood when the following Detailed Description is read with reference to the accompanying drawings, where:

FIG. 4 is a table illustrating data relating to radio devices detected by a tool listening device, according to an aspect.

DETAILED DESCRIPTION

Figure 1:
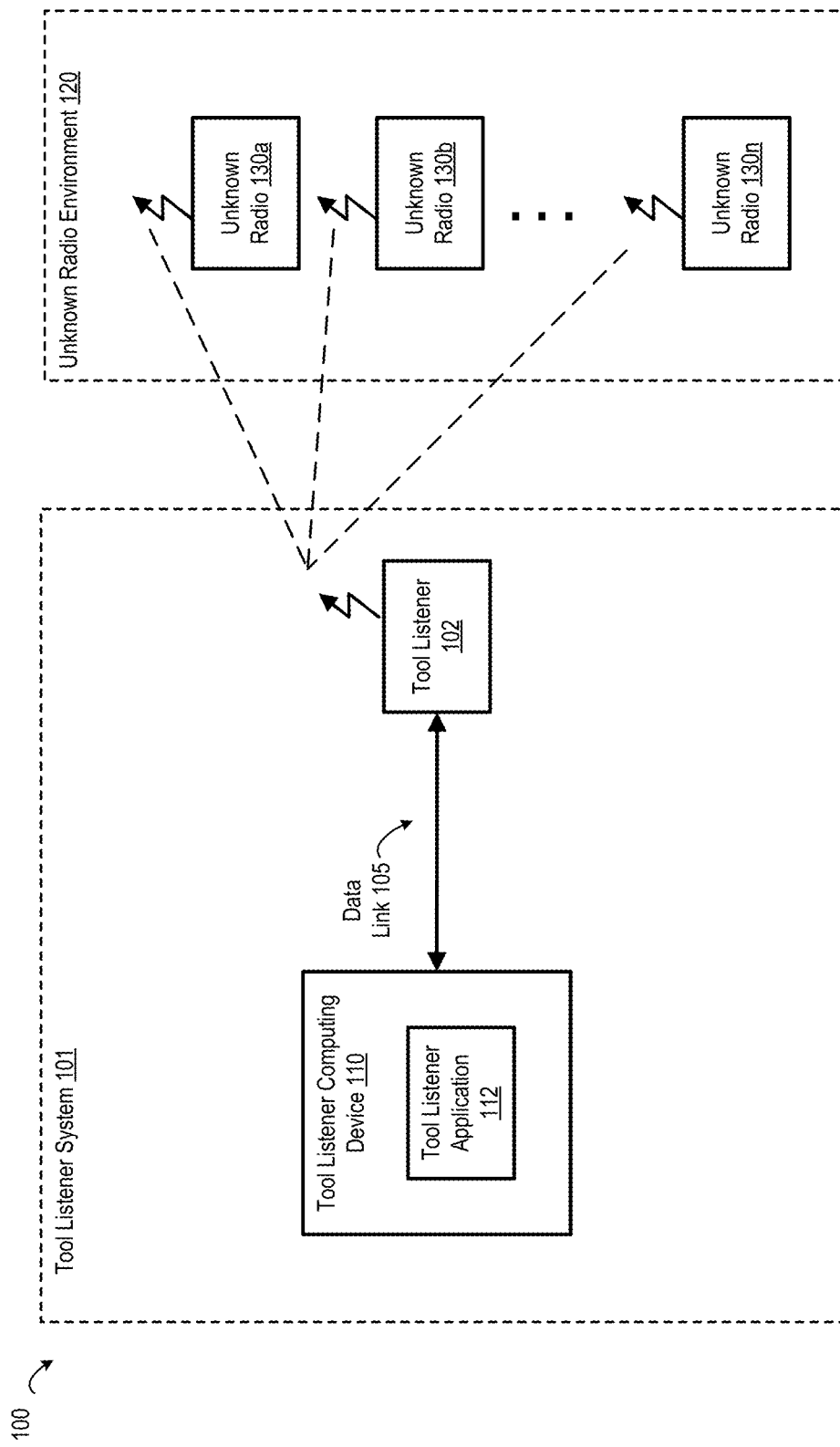
FIG. 1 illustrates an example of a tool listener environment, according to an aspect.

Aspects of the present invention relate to using a tool listening device to detect wireless devices such as smart meters. The tool listening device, or tool listener, is configured to listen for devices operating or attempting to operate on a wireless network such as a mesh network. The tool listener does not need to join a mesh network in order to detect network communications and does not need to use parameters with identical configuration as the network. For example, the tool listener may use a discovery channel hopping sequence that is different from a channel hopping sequence of a mesh network and may listen for a predetermined amount of time that differs from a time slot of the mesh network.

Mesh networks, such as Institute of Electrical and Electronics Engineers (IEEE) 802.15.4 networks, are wireless personal area networks that are typically short-range, low-bitrate, and self-identifying networks. Advanced Metering Infrastructure (AMI) or smart meters can use mesh networks to communicate resource consumption or diagnostic information. Once connected to a network, devices on a mesh network operate within specified time slots and according to a particular channel-hopping sequence.

A channel hopping sequence includes a list of valid channels, a channel spacing, a bit rate, and a modulation index. The channel hopping sequence of a particular network can be a subset of the available channels of the region or country of operation. For example, if a regulatory body permits channels 1-10 for operation, a particular network, and therefore radios configured to operate on that network might use a channel hopping sequence that includes channels 1, 5, and 8. Additionally, devices on a mesh network utilize various communications features such as synchronization (or sync) words, beacon requests, and different frame types such as data frames, beacon frames, acknowledgement frames, and Media Access Control (MAC) command frames. Mesh devices may or may not emit a signal when they power on or reset such as a birth chirp.

The tool listener can listen on a set of radio channels for network activity, detect network activity without storing entire packets, save detected activity in a data structure, and provide the data to an external device such as a computer or tablet. The external device can visualize the data. Examples of visualization include displaying the data in a table, graph, chart, or as raw text. The tool listener can detect a presence of a specific device or can perform an inventory of unknown devices. Unknown devices can include wireless devices that are joined to a mesh network or are not joined to a mesh network, e.g., are attempting to communicate with a mesh network.

The following non-limiting examples are introduced for illustrative purposes. In a first example, the tool listening device is deployed in a meter repair facility to diagnose a particular smart meter that is defective or needs reconfiguration. The tool listener selects an initial channel according to a discovery channel hopping sequence and listens for communications for a predetermined amount of time. The predetermined amount of time can differ from the length of a time slot on a mesh network. Upon receiving communications, the tool listener filters out communications from the particular smart meter (or attempts at communications from the smart meter), stores the communications in a data structure, and then optionally provides the data to an external device. In an aspect, the tool listener can cause the particular device to join a temporary or diagnostic network in order to receive reprogramming commands.

In a second example, the tool listener is provided with a discovery channel hopping configuration including channels of a channel hopping sequence used by a particular network of meters. The tool listener selects an initial channel from the channel hopping sequence on which to listen and listens for a particular amount of time. If the tool listener detects activity on the channel, the tool listener attempts to receive a packet. A packet includes a preamble, a sync word, a header and a payload. The tool listener discards the payload of the packet and analyzes the header.

The tool listener stores the contents of the header, specifically a source address, a destination address, and a frame type, and provides this information to a tool listening application, which can visualize the information. The tool listener then selects a different channel in the discovery channel hopping sequence and continues to listen. Over time, the tool listener gathers information on previously unknown devices and networks and amasses an inventory of the number and type of devices within a certain range. Additionally, by querying an external database, the tool listener can determine whether any devices were removed or are no longer attempting to join a network.

Turning now to the figures, FIG. 1 illustrates an example of a tool listener environment, according to an aspect. Tool listener environment 100 includes tool listener system 101 and unknown radio environment 120. Tool listener system 101 includes one or more of tool listener 102, tool listener computing device 110, tool listener application 112, and data link 105. Unknown radio environment 120 includes one or more unknown radios 130a-n. Unknown radios 130a-n can be within smart meters or other grid devices.

By listening for traffic on different channels, tool listener 102 can determine whether any of unknown radios 130a-n are present in a wireless environment. Tool listener 102 can operate on wireless networks such as mesh networks, IEEE 802.15.4 networks, WiFi networks, Bluetooth networks, or other wireless networks.

In an example, tool listener 102 listens on a particular channel for a predetermined amount of time to detect the presence of any unknown radios 130a-n. Unknown radios 130a-n can operate within a channel hopping sequence that can be specific to a particular network. Tool listener 102 can operate in conjunction with tool listener computing device 110 and tool listener application 112 to detect the presence of one or more unknown radios 130a-n. For example, tool listener 102 can transmit data obtained by listening such as packets, headers, source addresses or destination addresses, or frame types across data link 105 to tool listener computing device 110 for further analysis and visualization.

Data link 105 can be a Universal Serial Bus (USB) connection, a Bluetooth connection, an Ethernet connection, a wireless connection, serial or parallel connection, or any suitable data link. Tool listener computing device 110 can be a laptop, desktop, tablet computer, mobile phone, or any other computing device. Tool listener application 112 executes on tool listener computing device 110 and which can perform some or all of the functionality described herein.

Figure 2:
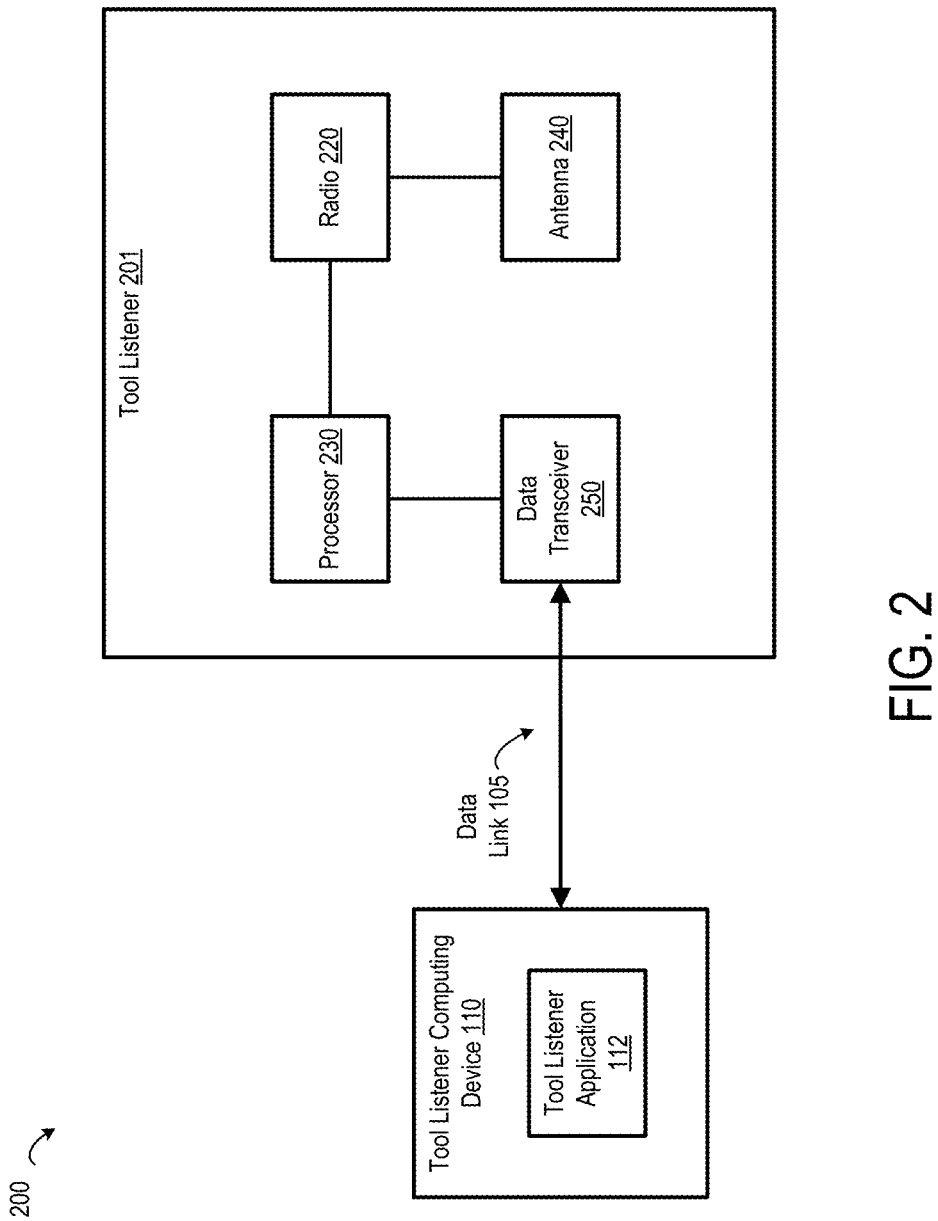
FIG. 2 illustrates an implementation of a tool listener system, according to an aspect.

FIG. 2 illustrates an implementation of a tool listener system, according to an aspect. FIG. 2 depicts tool listener system 200, which includes tool listener 201 and tool listener computing device 110. Tool listener 201 is an example of an implementation of tool listener 102. Tool listener 201 includes one or more of radio 220, processor 230, antenna 240, and data transceiver 250.

Radio 220 is a radio receiver or transmitter/receiver combination configured to operate according to a particular protocol such as IEEE 802.15.4. Radio 220 is connected to antenna 240. Antenna 240 can be any kind of antenna. Examples of suitable antennas include directional antennas or omnidirectional antennas. A directional antenna allows tool listener 201 to gather stronger signals from a particular area where smart meters are expected to be located. An omnidirectional antenna can be useful if a general location of unknown devices is not known. Radio 220 can receive commands from processor 230 such as when to listen, move to a different channel, power on, or power off, and can send received packet data back to processor 230.

Processor 230 can be any suitable microcontroller, microprocessor, signal processor, or embedded processor such as an Intel®-based processor, ARM®-based processor, etc. Processor 230 can execute firmware or software that performs the functions described herein such as processing packets and issuing commands to radio 220. Data transceiver 250 is a communications device that can send data and commands over data link 105 to tool listener computing device 110 and receive data and commands from tool listener computing device 110 over data link 105.

Processor 230 performs various functionality related to diagnostics of wireless networks. For example, processor 230 can access a particular discovery channel hopping sequence, configure radio 220 to operate at a particular channel for a particular amount of time, receive data from radio 220 or send data from radio 220.

Figure 3:
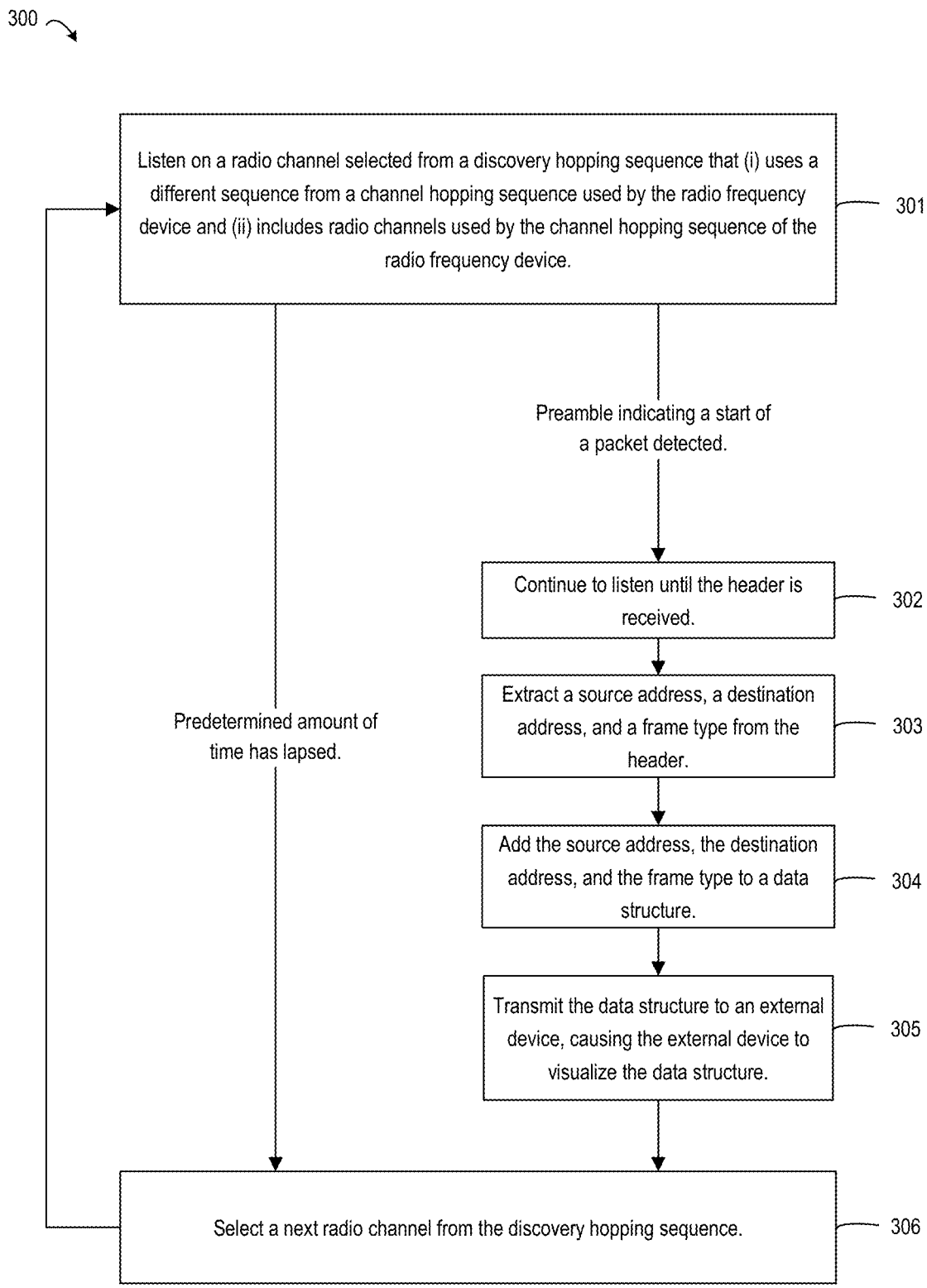
FIG. 3 is a flowchart illustrating a process used by a tool listening device to detect a presence of another device, according to an aspect.

FIG. 3 is a flowchart illustrating a process used by a tool listening device to detect a presence of another device, according to an aspect. Process 300 can be implemented by tool listener 102, tool listener 201, or by another device. Process 300 can be used to detect the presence of one or more unknown radio devices such as smart meters.

At block 301, process 300 involves listening on a radio channel selected from a discovery channel hopping sequence. Smart meters on a mesh network synchronize to an agreed-upon time slot and operate according to a channel hopping sequence. A channel hopping sequence as used by a mesh network device includes a list of valid channels, a channel spacing, a bit rate, and a modulation index. In contrast, the discovery channel sequence used by tool listener 102 can be a different sequence from a sequence used by a channel hopping sequence used by the radio frequency device and can include radio channels used by the channel hopping sequence of the radio frequency device.

Further, tool listener 102 operates asynchronously from broadcasts from unknown radios 130a-n and any other mesh networks. Tool listener 102 need not synchronize with or join a mesh network. Rather, tool listener 102 remains on a channel for a predetermined amount of time unless a packet is detected. The predetermined amount of time need not equal the amount of time of a network time slot, and can be adjusted by configuring the tool listener.

In an example, processor 230 accesses a particular discovery channel hopping sequence. Processor 230 causes radio 220 to operate at a first channel in the sequence. In turn, radio 220 operates at the first channel and listens for radio transmissions via antenna 240. If a preamble is not detected during the predetermined duration, processor 230 control is passed to block 306. Alternatively, if a preamble is detected, control is passed to block 302.

At block 302, process 300 involves continuing to listen until the header is received. A packet can include a preamble, a sync word, a packet header, and a payload. Tool listener 102 listens for a preamble, a sync word, and the header of a packet from one of unknown radios 130a-n on the selected channel. A header is received by radio 220 and sent to processor 230.

Processor 230 can discard the payload information, which is typically not needed, to save memory space. Even though tool listener 102 may not be configured to analyze the payload of the packet, tool listener 102 can receive and inspect the entire packet in order to check for errors. Processor 230 can cause radio 220 to continue to listen until the packet is received and can be checked for errors, even if the predetermined duration has lapsed.

At block 303, process 300 involves extracting a source address, a destination address, and a frame type from the header. More specifically, processor 230 extracts the packet header and extracts a source address, destination address, and frame type. If the IEEE 802.15.4 Personal Area Network (PAN) ID is present, the Network ID can also be captured. If the IEEE 802.15.4 Header Information Elements (IEs) contain the Network ID, the Network ID can also be captured. A network ID is used to distinguish between networks operated by different utilities e.g. when utility networks are adjacent.

At block 304, process 300 involves adding the source address, the destination address, the frame type and optional PAN ID and Network ID to a data structure. Tool listener 102 adds the captured information to a data structure.

In an aspect, processor 230 can aggregate identifiers or flags in the data structure indicating whether the frame type is an acknowledgement, data, beacon, or MAC command, etc. over time for a specific unknown radio 130a-n. The data structure can be stored locally, i.e., in memory connected to processor 230, or stored on tool listening computing device 110.

Processor 230 can use error detection to check for errors in the received packet. If errors are detected that cannot be recovered, then processor 230 can discard the erroneous packet or cause data transceiver 250 to send a message to the tool listener computing device 110 with any remaining useful information.

In an aspect, the tool listener receives a particular network address (e.g., a LAN identifier) or a particular Media Access Control (MAC) address of a meter and filter out or ignore other communications. For example, in the case of a specified network address, processor 230 checks the source address in the packet header against a network address corresponding to the specific device. If the network address does not match, then the entire packet is discarded. In this manner, the tool listener can focus on particular networks or devices of interest such as communications from a particular defective meter in a repair shop and ignore other meters that may be in the repair shop.

In another aspect, tool listener 102 can acquire a location signal from a Global Positioning Systems (GPS) or other location device. Tool listener 102 can access a database of smart devices expected at the location and verify network addresses detected against expected devices from the database to determine a presence of new or erroneous devices.

At block 305, process 300 involves transmitting the data structure to an external device causing the external device to visualize the data structure. Processor 230 sends the data structure to data transceiver 250 and causes data transceiver 250 to send the information across data link 105 to tool listener computing device 110. Tool listener 102 can maintain the data structure locally and periodically transmit the data structure to the tool listener computing device 110, which can perform further visualization and analysis. Optionally, tool listener computing device 110 periodically queries the radio for this information table and updates the visualization accordingly. In an aspect, tool listener computing device 110 can aggregate, display, or visualize data that indicates whether the frame type is an acknowledgement, data, beacon, or MAC command, etc. over time for a specific unknown radio 130a-n.

Tool listener computing device 110 can display the data in real-time. Over time, tool listener 102 can capture multiple packets received from a particular unknown radio 130a-n. In this manner, tool listener 102 adds new data and frame types to the table over time to build an aggregate image of the traffic from neighboring radios. In order to visualize a large number of data packets, data can be indexed by MAC address and/or network ID. An example table showing an example of data presented by tool listening computing device 110 is shown in FIG. 4.

At block 306, process 300 involves selecting a next radio channel from the discovery channel hopping sequence. Process 300 continues at block 301, using the next channel. If no network activity is detected during the predetermined amount of time, then processor 230 cycles through the discovery channel hopping sequence, remaining on each channel for the predetermined amount of time. Processor 230 need not cycle through the channels of the discovery channel hopping sequence in the same order defined by the channel hopping sequence; different orders of channels are possible.

FIG. 4 is a table illustrating data relating to radio devices detected by a tool listening device, according to an aspect. FIG. 4 depicts table 400. Table 400 can be populated by tool listener system 101, tool listener system 200, or by another suitable system or device executing process 300 or a similar process.

Table 400 includes entries 401a-n. Each entry can correspond to a detected packet from a wireless network. For example, each entry 401a-n includes a LAN address (address of a particular device), PAN ID (or network address), ACK (acknowledgement), MAC Command, DATA, and BEACON.

The ACK field refers to whether the packet is an acknowledgement packet. The DATA field refers to whether the packet includes a data field. A BEACON field in a packet indicates that the packet includes a beacon request. A MAC COMMAND beacon request packet may indicate that a particular radio has not been successful in establishing a connection with a network and is attempting to communicate. Other fields are possible. A technician may use information gathered from the tool listener to determine that the radio is not properly configured or is defective.

As depicted, entry 401a includes LAN address ab:cd:ef: 01:02:03, PAN ID 10:01, ACK 0, DATA 1, BEACON 0, MAC COMMAND 1. Entry 401b includes LAN address ab:cd:ef:10:20:30, PAN ID 10:01, ACK 0, DATA 0, BEACON 1 and MAC COMMAND 0. Entry 401c includes LAN address ac:99:88:77:11:22, PAN ID 20:21, ACK 1, DATA 0, BEACON 0 and MAC COMMAND 1. Entry 401d includes LAN address ac:99:88:66:22:33, PAN ID 20:11, ACK 0, DATA 0, BEACON 0 and MAC COMMAND 1.

As can be seen, entries 401a and 401b have the same PAN ID and are likely communicating on the same network. In an aspect, entries originating from or destined for the same address can be aggregated to enable easier viewing.

Exemplary Computing Environment

Figure 5:
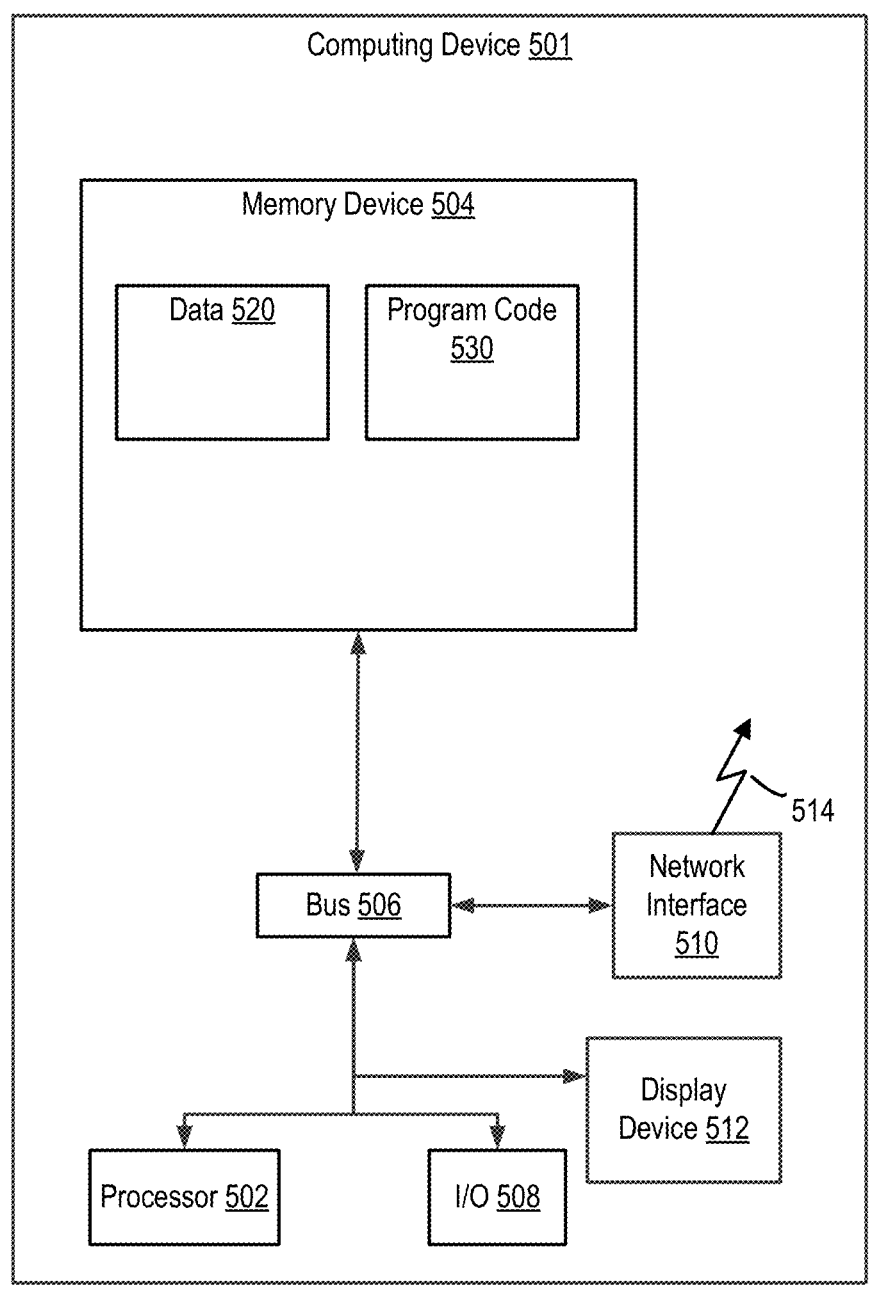
FIG. 5 illustrates a computing device used to implement certain functions of a tool listener, according to an aspect.

FIG. 5 illustrates computing environment 500 used to implement certain functions of a tool listener, according to an aspect. Any suitable computing system or device may be used for performing the operations described herein such as implementing the functions of tool listener 102, tool listener external computing device 110, or process 300. The depicted computing device 501 includes a processor 502 communicatively coupled to one or more memory devices 504. The processor 502 executes computer-executable program code 530 stored in a memory device 504, accesses data 520 stored in the memory device 504, or both. Examples of the processor 502 include a microprocessor, an application-specific integrated circuit ("ASIC"), a field-programmable gate array ("FPGA"), or any other suitable processing device. The processor 502 can include any number of processing devices or cores, including a single processing device. The functionality of the computing device may be implemented in hardware, software, firmware, or a combination thereof.

The memory device 504 includes any suitable non-transitory computer-readable medium for storing data, program code, or both. A computer-readable medium can include any electronic, optical, magnetic, or other storage device capable of providing a processor with computer-readable instructions or other program code. Non-limiting examples of a computer-readable medium include a flash memory, a ROM, a RAM, an ASIC, or any other medium from which a processing device can read instructions. The instructions may include processor-specific instructions generated by a compiler or an interpreter from code written in any suitable computer-programming language, including, for example, C, C++, C #, Visual Basic, Java, or scripting language.

The computing device 501 may also include a number of external or internal devices, such as input or output devices. For example, the computing device 501 is shown with one or more input/output ("I/O") interfaces 508. An I/O interface 508 can receive input from input devices or provide output to output devices. One or more busses 506 are also included in the computing device 501. The bus 506 communicatively couples one or more components of a respective one of the computing device 501.

The computing device 501 executes program code 530 that configures the processor 502 to perform one or more of the operations described herein. For example, the program code 530 causes the processor to perform the operations described in FIG. 3.

The computing device 501 also includes a network interface device 510. The network interface device 510 includes any device or group of devices suitable for establishing a wired or wireless data connection to one or more data networks. The network interface device 510 may be a wireless device and have an antenna 514. The computing device 501 can communicate with one or more other computing devices implementing the computing device or other functionality via a data network using the network interface device 510.

The computing device 501 can also include a display device 512. Display device 512 can be a LCD, LED, touch-screen or other device operable to display information about the computing device 501. For example, information could include an operational status of the computing device, network status, etc.

While the present subject matter has been described in detail with respect to specific aspects thereof, it will be appreciated that those skilled in the art, upon attaining an understanding of the foregoing, may readily produce alterations to, variations of, and equivalents to such aspects. Accordingly, it should be understood that the present disclosure has been presented for purposes of example rather than limitation and does not preclude inclusion of such modifications, variations, and/or additions to the present subject matter as would be readily apparent to one of ordinary skill in the art.

What is claimed is:

1. A method comprising:

listening, without joining a mesh network, on a radio channel selected from a discovery channel hopping sequence, wherein the discovery channel hopping sequence (i) uses a different sequence from a sequence used by a channel hopping sequence used by a radio operating on a first mesh network and a channel hopping sequence used by a second radio operating on a second mesh network and (ii) comprises a plurality of radio channels used by the channel hopping sequence of the radio;

when a preamble of a packet is received on the radio channel:
continuing to listen on the radio channel until a header is received, and
transmitting the header to an external device using a data link, wherein the header includes at least one identifier associated with the first mesh network;

after receiving the packet, selecting a subsequent radio channel from the discovery channel hopping sequence;

listening, without joining the second mesh network, on the subsequent radio channel; and when a preamble of a second packet is received on the subsequent radio channel:
continuing to listen on the subsequent radio channel until a second header is received, and
transmitting the second header to the external device using the data link, wherein the second header includes at least one identifier associated with the second mesh network.

2. The method of claim 1, wherein the packet comprises a payload, the method further comprising when the preamble of a packet is received, discarding the payload.

3. The method of claim 1, wherein the packet is (i) an acknowledgement packet, (ii) a beacon packet, (iii) a beacon request packet, or (iv) a data packet.

4. The method of claim 1, wherein the discovery channel hopping sequence comprises all of the plurality of radio channels used by the channel hopping sequence of the radio.

5. The method of claim 1, wherein the packet further comprises (i) a PAN ID or (ii) a network ID, the method further comprising extracting the (i) PAN ID or (ii) network ID and providing the (i) PAN ID or (ii) network ID to the external device.

6. The method of claim 1, wherein when no preamble of a packet is received on the radio channel, waiting for a predetermined amount of time to elapse, wherein the predetermined amount of time differs from a slot time used by the radio when operating on the first mesh network.

7. The method of claim 1, further comprising:
identifying, from the header, a source address corresponding to the radio operating on the first mesh network; and
causing the radio to join a diagnostic network.

8. A method comprising:
listening, without joining or synchronizing to a mesh network, on a radio channel selected from a discovery channel hopping sequence for a communication from a device joined to the mesh network, wherein the discovery channel hopping sequence comprises a sequence of radio channels different from a channel hopping sequence used for communication on the mesh network;
responsive to identifying a preamble of a packet, the packet comprising a header:
continuing to listen until the packet is received;
analyzing the packet to identify information from the header of the packet; and
storing information from the header of the packet in a data structure;
after receiving the packet, selecting a next radio channel from the discovery channel hopping sequence;
listening, without joining or synchronizing to a second mesh network, on the next radio channel selected from the discovery channel hopping sequence for a communication from a second device joined to the second mesh network;
responsive to identifying a preamble of a second packet, the second packet comprising a header:
continuing to listen until the second packet is received;
analyzing the second packet to identify information from the header of the second packet; and
storing information from the header of the second packet in the data structure.

9. The method of claim 8, further comprising extracting, from the packet, a network address and a frame type, wherein the frame type comprises acknowledgement, data, or beacon.

10. The method of claim 8, further comprising identifying, from the header, a device identifier corresponding to the device.

11. The method of claim 10, further comprising associating the information from the header of the packet with information from another header of another packet having an identical identifier in the data structure.

12. The method of claim 8, wherein the discovery channel hopping sequence comprises all of a plurality of radio channels used by the channel hopping sequence of the mesh network.

13. The method of claim 8, wherein the header further comprises (i) a PAN ID or (ii) a network ID, the method further comprising extracting the (i) PAN ID or (ii) network ID.

14. A method comprising:
identifying a first radio channel in a discovery channel hopping sequence, wherein the discovery channel hopping sequence (i) uses a different sequence from a sequence used by a channel hopping sequence used by a mesh network and (ii) comprises a plurality of radio channels used by the channel hopping sequence of the mesh network;
listening on the first radio channel without joining the mesh network;
when no communication is detected on the first radio channel for a predetermined amount of time, switching to a second radio channel in the discovery channel hopping sequence, wherein the predetermined amount of time differs from a slot time used by the mesh network;
listening on the second radio channel without joining the mesh network;
while listening on the second radio channel, detecting a preamble of a packet comprising a header, and continuing to listen on the second radio channel until the header is received;
identifying, from the header, a source address corresponding to a device associated with the packet and the mesh network;
switching to a third radio channel in the discovery channel hopping sequence;
listening on the third radio channel without joining a second mesh network;
while listening on the third radio channel, detecting a preamble of a second packet comprising a header, and continuing to listen on the third radio channel until the header of the second packet is received; and
identifying, from the header, a source address corresponding to a second device associated with the second packet and the second mesh network.

15. The method of claim 14, further comprising extracting, from the packet, a network address and a frame type, wherein the frame type comprises acknowledgement, data, or beacon.

16. The method of claim 14, further comprising identifying a particular radio by identifying a particular network address corresponding to the particular radio from the header.

17. The method of claim 14, further comprising identifying a first packet and a subsequent packet, wherein the first packet and the subsequent packet originate from a particular radio, and causing an external device to display information from the first packet and the subsequent packet in a visualization.

18. The method of claim 14, wherein the packet further comprises a cyclic redundancy check, the method further comprising determining, based on the cyclic redundancy check, that the packet is valid.

19. The method of claim 14, wherein the packet comprises a payload, the method further comprising discarding the payload of the packet.

20. The method of claim 14, wherein the discovery channel hopping sequence comprises all of the plurality of radio channels used by the channel hopping sequence of the mesh network.

* * * * *